United States Patent
Holcomb

(10) Patent No.: US 7,830,963 B2
(45) Date of Patent: Nov. 9, 2010

(54) DECODING JOINTLY CODED TRANSFORM TYPE AND SUBBLOCK PATTERN INFORMATION

(75) Inventor: Thomas W. Holcomb, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 1406 days.

(21) Appl. No.: 10/893,702

(22) Filed: Jul. 16, 2004

(65) Prior Publication Data

US 2005/0025246 A1 Feb. 3, 2005

Related U.S. Application Data

(60) Provisional application No. 60/488,710, filed on Jul. 18, 2003.

(51) Int. Cl.
H04N 7/12 (2006.01)
G06K 9/36 (2006.01)

(52) U.S. Cl. .................. 375/240.23; 382/232

(58) Field of Classification Search .......... 348/395, 348/403, 404, 405, 407, 413; 382/238, 236, 382/243, 232, 239, 246, 244, 250, 245; 386/46, 386/82; 375/240.16, 240.17, 240.24
See application file for complete search history.

(56) References Cited

U.S. PATENT DOCUMENTS

| | | | |
|---|---|---|---|
| 4,691,329 A | 9/1987 | Juri et al. | |
| 4,796,087 A | 1/1989 | Guichard et al. | |
| 5,107,345 A * | 4/1992 | Lee | 382/250 |
| 5,117,287 A | 5/1992 | Koike et al. | |
| 5,422,676 A | 6/1995 | Herpel et al. | |
| 5,467,134 A | 11/1995 | Laney et al. | |
| 5,477,272 A | 12/1995 | Zhang et al. | |
| 5,544,286 A | 8/1996 | Laney | |
| 5,598,483 A * | 1/1997 | Purcell et al. | 382/232 |
| 5,748,789 A | 5/1998 | Lee et al. | |
| 5,825,929 A | 10/1998 | Chen et al. | |
| 5,844,613 A | 12/1998 | Chaddha | |
| 5,905,815 A * | 5/1999 | Mack et al. | 382/250 |
| 5,937,095 A | 8/1999 | Machida | |
| 5,946,043 A | 8/1999 | Lee et al. | |
| 6,067,322 A | 5/2000 | Wang | |
| 6,215,910 B1 | 4/2001 | Chaddha | |
| 6,233,017 B1 | 5/2001 | Chaddha | |
| 6,337,881 B1 | 1/2002 | Chaddha | |
| 6,501,798 B1 | 12/2002 | Sivan | |

(Continued)

OTHER PUBLICATIONS

Hallapuro et al., "Performance Analysis of Low Bit Rate H.26L Video Encoder," *Proc. IEEE International Conference on Acoustics, Speech and Signal Processing*, vol. 2, pp. 1129-1132 (May 2001).

(Continued)

*Primary Examiner*—Behrooz Senfi
(74) *Attorney, Agent, or Firm*—Klarquist Sparkman, LLP

(57) ABSTRACT

Techniques and tools are described for decoding jointly information. For example, a decoder decodes a variable length ["VLC"] signaled at macroblock level that jointly represents a transform type signal level, transform type, and subblock pattern. The decoder decodes one or more VLCs signaled at block level, each jointly representing a transform type and subblock pattern. The decoder may select between multiple VLC tables for the VLCs signaled macroblock level and/or block level.

30 Claims, 16 Drawing Sheets

U.S. PATENT DOCUMENTS

| | | | |
|---|---|---|---|
| 6,571,016 | B1 | 5/2003 | Mehrotra et al. |
| 6,795,584 | B2 | 9/2004 | Karczewicz et al. |
| 6,983,018 | B1 * | 1/2006 | Lin et al. ............... 375/240.16 |
| 7,266,149 | B2 | 9/2007 | Holcomb et al. |
| 2002/0027954 | A1 * | 3/2002 | Singh et al. ............ 375/240.03 |
| 2002/0097802 | A1 | 7/2002 | Lin et al. |
| 2002/0154227 | A1 * | 10/2002 | Lan et al. ................. 348/240.2 |
| 2003/0099292 | A1 | 5/2003 | Wang et al. |
| 2003/0156648 | A1 * | 8/2003 | Holcomb et al. ....... 375/240.18 |
| 2003/0185306 | A1 | 10/2003 | MacInnis et al. |
| 2004/0005096 | A1 * | 1/2004 | Kim et al. .................... 382/243 |
| 2004/0062309 | A1 | 4/2004 | Romanowski et al. |
| 2004/0252768 | A1 | 12/2004 | Suzuki et al. |
| 2005/0036759 | A1 * | 2/2005 | Lin et al. ....................... 386/46 |
| 2005/0135484 | A1 | 6/2005 | Lee et al. |
| 2005/0254583 | A1 * | 11/2005 | Kim et al. .............. 375/240.23 |
| 2006/0209962 | A1 * | 9/2006 | Park et al. .............. 375/240.16 |
| 2007/0098278 | A1 * | 5/2007 | Sun et al. .................... 382/236 |
| 2008/0049834 | A1 | 2/2008 | Holcomb et al. |

OTHER PUBLICATIONS

Horn et al, "Bit allocation methods for closed-loop coding of oversampled pyramid decompositions," *Proc. of IEEE International Conference on Image Processing*, 4 pp. (1997).

Sullivan et al., "The H.264/AVC Advanced Video Coding Standard: Overview and Introduction to the Fidelity Range Extensions," 21 pp. (Aug. 2004).

Wiegand, "Joint Model No. 1, Revision 1 (JM1-r1)," JVT-A003r1, 80 pp. (document marked "Generated: Jan. 18, 2002").

Wien, "Variable Block-Size Transforms for Hybrid Video Coding," Dissertation, 182 pp. (Feb. 2004).

Wien et al., "16 Bit Adaptive Block size Transforms," JVT-C107r1, 54 pages.

Reader, "History of MPEG Video Compression—Ver. 4.0," 99 pp., document marked Dec. 16, 2003.

Printouts of FTP directories from http://ftp3.itu.ch , 8 pp. (downloaded from the World Wide Web on Sep. 20, 2005.).

U.S. Appl. No. 60/341,674, filed Dec. 17, 2001, Lee et al.

U.S. Appl. No. 60/488,710, filed Jul. 18, 2003, Srinivasan et al.

ISO/IEC 14496-2, "Coding of Audio-Visual Objects: Visual, ISO/IEC 14496-2," 326 pp. (1998).

ITU-T Recommendation H.261, "Line Transmission of Non-Telephone Signals," International Telecommunication Union, 29 pp. (Mar. 1993).

ITU-T Recommendation H.262, "Transmission of Non-Telephone Signals," International Telecommunication Union, 216 pp. (Jul. 1995).

ITU-T Recommendation H.263, "Series H: Audiovisual and Multimedia Systems, Infrastructure of Audiovisual Services—Coding of Moving Video," International Telecommunication Union, 167 pp. (Feb. 1998).

Joint Video Team (JVT) of ISO/IEC MPEG and ITU-T VCEG, "Joint Committee Draft (CD), JVT-C167," $3^{rd}$ Meeting: Fairfax, Virginia, USA, 142 pp. (May 2002).

Lee et al., "Variable Block Size Techniques for Motion Sequence Coding," Proc. First Korea-Japan Joint Workshop on Multi-media Communications, 12 pp. (1994).

Mehrotra et al., "Adaptive Coding Using Finite State Hierarchical Table Lookup Vector Quantization with Variable Block Sizes," 5 pp. (1996).

Microsoft Corporation, "Microsoft Debuts New Windows Media Player 9 Series, Redefining Digital Media on the PC," 4 pp. (Sep. 4, 2002) [Downloaded from the World Wide Web on Jul. 16, 2004].

Mook, "Next-Gen Windows Media Player Leaks to the Web," BetaNews, 17 pp. (Jul. 2002).

Ribas-Corbera et al., "On the Optimal Block Size for Block-based Motion-Compensated Video Coders," SPIE Proc. of Visual Communications and Image Processing, vol. 3024, 12 pp. (1997).

Ribas-Corbera et al., "On the Optimal Motion Vector Accuracy for Block-based Motion-Compensated Video Coders," Proc. SPIE Digital Video Compression, San Jose, CA, 13 pp. (1996).

Wien, "H.26L Core Experiment on Adaptive Block Transforms," International Telecommunication Union, 2 pp. [Downloaded from the World Wide Web on Nov. 11, 2002.].

Chen et al., "Variable Block-size Image Coding by Resource Planning," Proc. Int'l Conf. on Image Science, Systems, and Technology, Las Vegas, 10 pp. (1997).

ISO/IEC 11172-2, "Coding of Moving Pictures and Associated Audio for Digital Storage Media at Up to About 1,5 Mbit/s, Part 2: Video," 122 pp. (1993).

* cited by examiner

Software 380 implementing video encoder and/or decoder with joint coding and/or decoding of transform signal level, transform type, and/or subblock pattern information

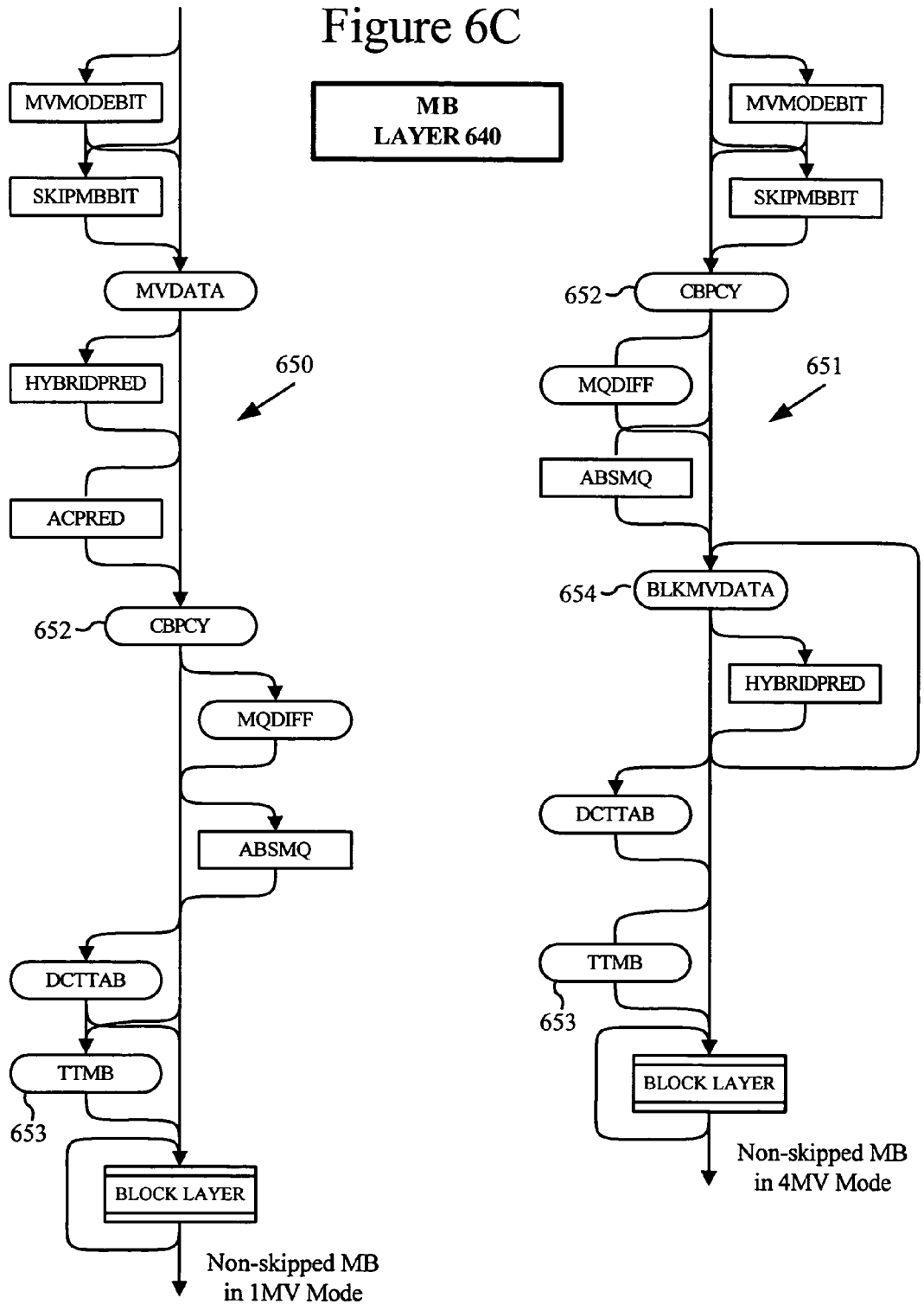

Figure 7A

TTMB VLC Table 1: High Rate (PQUANT < 5)

| TTMB VLC | Transform Type | Signal Level | Subblock Pattern |
|---|---|---|---|
| 00 | 8x4 | Block | Both |
| 01 | 8x8 | Block | NA |
| 11 | 4x8 | Block | Both |
| 100 | 4x4 | Block | NA |
| 10100 | 8x8 | Macroblock | NA |
| 10101 | 4x8 | Block | Left |
| 10110 | 4x8 | Block | Right |
| 101110 | 8x4 | Block | Bottom |
| 1011111 | 8x4 | Block | Top |
| 101111001 | 8x4 | Macroblock | Top |
| 101111010 | 4x4 | Macroblock | NA |
| 101111011 | 8x4 | Macroblock | Both |
| 1011110001 | 8x4 | Macroblock | Bottom |
| 10111100001 | 4x8 | Macroblock | Both |
| 101111000000 | 4x8 | Macroblock | Right |
| 101111000001 | 4x8 | Macroblock | Left |

Figure 7B

TTMB VLC Table 2: Medium Rate (5 =< PQUANT < 13)

| TTMB VLC | Transform Type | Signal Level | Subblock Pattern |
|---|---|---|---|
| 10 | 8x8 | Macroblock | NA |
| 000 | 4x8 | Block | Both |
| 010 | 4x4 | Block | NA |
| 110 | 8x8 | Block | NA |
| 0011 | 8x4 | Block | Top |
| 0110 | 8x4 | Block | Bottom |
| 0111 | 8x4 | Block | Both |
| 1110 | 4x8 | Block | Left |
| 1111 | 4x8 | Block | Right |
| 001001 | 4x8 | Macroblock | Left |
| 001011 | 8x4 | Macroblock | Both |
| 0010001 | 8x4 | Macroblock | Top |
| 0010100 | 8x4 | Macroblock | Bottom |
| 0010101 | 4x8 | Macroblock | Both |
| 00100000 | 4x8 | Macroblock | Left |
| 00100001 | 4x4 | Macroblock | NA |

Figure 7C

TTMB VLC Table 3: Low Rate (PQUANT >= 13)

| TTMB VLC | Transform Type | Signal Level | Subblock Pattern |
|---|---|---|---|
| 10 | 8x8 | Macroblock | NA |
| 000 | 8x4 | Block | Bottom |
| 010 | 4x8 | Block | Right |
| 011 | 4x8 | Block | Left |
| 110 | 8x8 | Block | NA |
| 0011 | 4x8 | Block | Both |
| 1110 | 8x4 | Block | Top |
| 1111 | 4x4 | Block | NA |
| 00101 | 8x4 | Block | Both |
| 001001 | 8x4 | Macroblock | Both |
| 0010001 | 4x8 | Macroblock | Both |
| 00100001 | 8x4 | Macroblock | Top |
| 001000001 | 4x8 | Macroblock | Left |
| 0010000001 | 8x4 | Macroblock | Bottom |
| 00100000000 | 4x4 | Macroblock | NA |
| 00100000001 | 4x8 | Macroblock | Right |

Figure 8A

TTBLK VLC Table 1: High Rate (PQUANT < 5)

| TTBLK VLC | Transform Type | Subblock Pattern |
|---|---|---|
| 00 | 8x4 | Both |
| 01 | 4x8 | Both |
| 11 | 8x8 | NA |
| 101 | 4x4 | NA |
| 10000 | 8x4 | Top |
| 10001 | 8x4 | Bottom |
| 10010 | 4x8 | Right |
| 10011 | 4x8 | Left |

Figure 8B

TTBLK VLC Table 2: Medium Rate (5 =< PQUANT < 13)

| TTBLK VLC | Transform Type | Subblock Pattern |
|---|---|---|
| 11 | 8x8 | NA |
| 000 | 4x8 | Right |
| 001 | 4x8 | Left |
| 010 | 4x4 | NA |
| 011 | 8x4 | Both |
| 101 | 4x8 | Both |
| 1000 | 8x4 | Bottom |
| 1001 | 8x4 | Top |

Figure 8C

TTBLK VLC Table 3: Low Rate (PQUANT >= 13)

| TTBLK VLC | Transform Type | Subblock Pattern |
|---|---|---|
| 01 | 8x8 | NA |
| 000 | 4x8 | Both |
| 001 | 4x4 | NA |
| 100 | 8x4 | Bottom |
| 110 | 4x8 | Right |
| 111 | 4x8 | Left |
| 1010 | 8x4 | Both |
| 1011 | 8x4 | Top |

Figure 9A

SUBBLKPAT VLC Table 1: High Rate (PQUANT < 5)

| SUBBLKPAT VLC | Subblock Pattern | SUBBLKPAT VLC | Subblock Pattern |
|---|---|---|---|
| 1 | 15 | 01010 | 8 |
| 0000 | 11 | 01011 | 4 |
| 0001 | 13 | 01100 | 2 |
| 0010 | 7 | 01110 | 1 |
| 00110 | 12 | 01111 | 14 |
| 00111 | 3 | 011010 | 6 |
| 01000 | 10 | 011011 | 9 |
| 01001 | 5 | | |

Figure 9B

TTBLK VLC Table 2: Medium Rate (5 =< PQUANT < 13)

| SUBBLKPAT VLC | Subblock Pattern | SUBBLKPAT VLC | Subblock Pattern |
|---|---|---|---|
| 01 | 15 | 1111 | 4 |
| 000 | 2 | 00100 | 6 |
| 0011 | 12 | 00101 | 9 |
| 1000 | 3 | 10110 | 14 |
| 1001 | 10 | 10111 | 7 |
| 1010 | 5 | 11000 | 13 |
| 1101 | 8 | 11001 | 11 |
| 1110 | 1 | | |

Figure 9C

SUBBLKPAT VLC Table 3: Low Rate (PQUANT >= 13)

| SUBBLKPAT VLC | Subblock Pattern | SUBBLKPAT VLC | Subblock Pattern |
|---|---|---|---|
| 010 | 4 | 1111 | 15 |
| 011 | 8 | 00000 | 6 |
| 101 | 1 | 00001 | 9 |
| 110 | 2 | 10010 | 14 |
| 0001 | 12 | 10011 | 13 |
| 0010 | 3 | 11100 | 7 |
| 0011 | 10 | 11101 | 11 |
| 1000 | 5 | | |

Figure 10
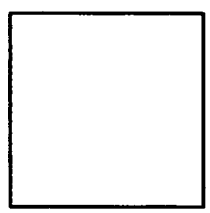
8x8
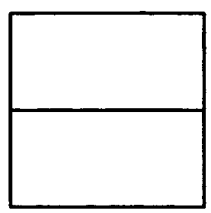
8x4
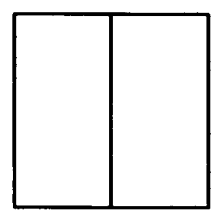
4x8
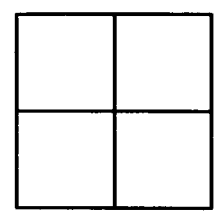
4x4

DECODING JOINTLY CODED TRANSFORM TYPE AND SUBBLOCK PATTERN INFORMATION

CROSS REFERENCE TO RELATED APPLICATION

This application claims the benefit of U.S. Provisional Patent Application Ser. No. 60/488,710, filed Jul. 18, 2003, the disclosure of which is incorporated herein by reference.

COPYRIGHT AUTHORIZATION

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

TECHNICAL FIELD

Tools and techniques for video decoding are described. For example, a video decoder processes jointly coded transform signal level, transform type, and subblock pattern information.

BACKGROUND

Digital video consumes large amounts of storage and transmission capacity. A typical raw digital video sequence includes 15 or 30 frames per second. Each frame can include tens or hundreds of thousands of pixels (also called pels), where each pixel represents a tiny element of the picture. In raw form, a computer commonly represents a pixel as a set of three samples totaling 24 bits. For instance, a pixel may include an 8-bit luminance sample (also called a luma sample) that defines the grayscale component of the pixel and two 8-bit chrominance samples (also called chroma samples) that define the color component of the pixel. Thus, the number of bits per second, or bit rate, of a typical raw digital video sequence may be 5 million bits per second or more.

Many computers and computer networks lack the resources to process raw digital video. For this reason, engineers use compression (also called coding or encoding) to reduce the bit rate of digital video. Compression decreases the cost of storing and transmitting video by converting the video into a lower bit rate form. Decompression (also called decoding) reconstructs a version of the original video from the compressed form. A "codec" is an encoder/decoder system. Compression can be lossless, in which the quality of the video does not suffer, but decreases in bit rate are limited by the inherent amount of variability (sometimes called entropy) of the video data. Or, compression can be lossy, in which the quality of the video suffers, but achievable decreases in bit rate are more dramatic. Lossy compression is often used in conjunction with lossless compression—the lossy compression establishes an approximation of information, and the lossless compression is applied to represent the approximation.

In general, video compression techniques include "intra-picture" compression and "inter-picture" compression, where a picture is, for example, a progressively scanned video frame, an interlaced video frame (having alternating lines for video fields), or an interlaced video field. For progressive frames, intra-picture compression techniques compress individual frames (typically called I-frames or key frames), and inter-picture compression techniques compress frames (typically called predicted frames, P-frames, or B-frames) with reference to preceding and/or following frames (typically called (having alternating lines for video fields), or an interlaced video field. For progressive frames, intra-picture compression techniques compress individual frames (typically called I-frames or key frames), and inter-picture compression techniques compress frames (typically called predicted frames, P-frames, or B-frames) with reference to preceding and/or following frames (typically called reference or anchor frames).

Inter-picture compression techniques often use motion estimation and motion compensation. For motion estimation, for example, an encoder divides a current predicted field or frame into 8×8 or 16×16 pixel units. For a unit of the current field or frame, a similar unit in a reference field or frame is found for use as a predictor. A motion vector indicates the location of the predictor in the reference field or frame. The encoder computes the sample-by-sample difference between the current unit and the predictor to determine a residual (also called error signal). If the current unit size is 16×16, the residual is divided into four 8×8 blocks. To each 8×8 residual, the encoder applies a reversible frequency transform operation, which generates a set of frequency domain (i.e., spectral) coefficients. A discrete cosine transform ["DCT"] is a type of frequency transform. The resulting blocks of spectral coefficients are quantized and entropy encoded. If the predicted field or frame is used as a reference for subsequent motion compensation, the encoder reconstructs the predicted field or frame. When reconstructing residuals, the encoder reconstructs transforms coefficients (e.g., DCT coefficients) that were quantized and performs an inverse frequency transform such as an inverse DCT ["IDCT"]. The encoder performs motion compensation to compute the predictors, and combines the predictors with the residuals. During decoding, a decoder typically entropy decodes information and performs analogous operations to reconstruct residuals, perform motion compensation, and combine the predictors with the residuals.

I. Inter-Frame Compression in Windows Media Video, Version 8 ["WMV8"]

Microsoft Corporation's Windows Media Video, Version 8["WMV8"] includes a video encoder and a video decoder. The WMV8 encoder uses intra-frame and inter-frame compression, and the WMV8 decoder uses intra-frame and inter-frame decompression. When processing 8×8 blocks of motion compensation prediction residuals, the WMV8 encoder/decoder may switch between different sizes of DCT/IDCT. In particular, the encoder/decoder may use of one of an 8×8 DCT/IDCT, two 4×8 DCT/IDCTs, or two 8×4 DCT/IDCTs for a prediction residual block.

For example, FIG. 1 shows transform coding and compression of an 8×8 prediction error block (110) using two 8×4 DCTs (140). A video encoder computes (108) an error block (110) as the difference between a predicted block (102) and a current 8×8 block (104). The video encoder applies either an 8×8 DCT (not shown), two 8×4 DCTs (140), or two 4×8 DCTs (not shown) to the error block (110). For the 8×4 DCT (140), the error block (110) becomes two 8×4 blocks of DCT coefficients (142, 144), one for the top half of the error block (110) and one for the bottom half. The encoder quantizes (146) the data, which typically results in many of the coefficients being remapped to zero. The encoder scans (150) the blocks of quantized coefficients (147, 148) into one-dimensional arrays (152, 154) with 32 elements each, such that coefficients are generally ordered from lowest frequency to highest frequency in each array. In the scanning, the encoder uses a scan pattern for the 8×4 DCT. (For other size transforms, the encoder uses different scan patterns.) The encoder entropy codes the data in the one-dimensional arrays (152, 154) using a combination of run length coding (180) and variable length encoding (190) with one or more run/level/last tables (185).

FIG. 2 shows decompression and inverse transform coding of an 8×8 prediction error block (210) using two 8×4 IDCTs (240). The decoder may also perform inverse transform coding using a 4×8 IDCT or 8×8 IDCT (not shown). The decoder entropy decodes data into one-dimensional arrays (252, 254) of quantized coefficients using a combination of variable length decoding (290) and run length decoding (280) with one or more run/level/last tables (285). The decoder scans (250) the data into blocks of quantized DCT coefficients (247, 248) using the scan pattern for the 8×4 DCT. (The decoder uses other scan patterns for an 8×8 or 4×8 DCT.) The decoder inverse quantizes (246) the data and applies (240) an 8×4 IDCT to the coefficients, resulting in an 8×4 block (212) for the top half of the error block (210) and an 8×4 block (214) for the bottom half of the error block (210). The decoder combines the error block (210) with a predicted block (202) (from motion compensation) to form a reconstructed 8×8 block (204).

The WMV8 encoder and decoder can adaptively change the transform size used for residuals at frame level, macroblock level, or block level. Basically, a frame-level flag (0/1 decision bit) indicates whether one transform type is used for all coded blocks in the frame. If so, the transform type is signaled at frame level. If not (i.e., if different transform types are used within the frame), a macroblock-level flag present for each coded macroblock indicates whether a single transform type is used for all coded blocks in the macroblock. If so, the transform type is signaled at macroblock level. If not (i.e., if different transform types are used within the macroblock), the transform types for the respective coded blocks are signaled at block level. Table 1 shows variable length codes ["VLCs"] for transform types in WMV8.

TABLE 1

VLCs for transform types in WMV8

| VLC | Transform Type |
| --- | --- |
| 0 | 8×8 DCT |
| 10 | 8×4 DCT |
| 11 | 4×8 DCT |

If the transform size is a subblock size, the WMV8 encoder outputs a subblock pattern code for the subblocks of a block. The subblock pattern indicates which subblocks of the block have additional coefficient information signaled and which do not. For example, for a block with 8×4 subblocks, the subblock pattern indicates the presence of additional signaled coefficient information, for only the bottom, only the top, or both the top and bottom 8×4 subblocks. For a block with 4×8 subblocks, the subblock pattern indicates the presence of additional signaled coefficient information for only the left, only the right, or both the left and right 4×8 subblocks. Table 2 shows VLCs for subblock patterns in WMV8.

TABLE 2

VLCs for subblock patterns in WMV8

| SUBBLKPAT VLC | 8×4 Subblock Pattern | | 4×8 Subblock Pattern | |
| --- | --- | --- | --- | --- |
| | Top | Bottom | Left | Right |
| 0 |   | X |   | X |
| 10 | X | X | X | X |
| 11 | X |   | X |   |

In WMV8, subblock pattern codes are used at block level, and only when the block uses a subblock transform size. The WMV8 decoder receives subblock pattern codes and determines whether additional coefficient information is present for particular subblocks of a block.

While transform size switching in WMV8 helps overall performance in many scenarios, there are opportunities for improvement. At an extreme, every block in a frame has a transform size specified for it. This requires a great deal of signaling overhead, which can negate the benefits provided by adaptive transform sizes.

In addition, in WMV8 switching level flags, transform types, and subblock patterns are independently signaled in the bitstream. At the macroblock level, for example, one bit indicates whether the transform signaling is at the macroblock level or block level, and if macroblock-level signaling is used, a VLC signals which of three transform types to use, 8×8, 8×4 , or 4×8. At the block level, separate VLCs are used for transform types and subblock patterns. Signaling of switching levels, transform types, and subblock patterns in WMV8 is inefficient in some cases and thus provides an opportunity for improvement in performance.

II. Video Codec Standards

Various standards specify aspects of video decoders as well as formats for compressed video information. These standards include H.261, MPEG-1, H.262 (also called MPEG-2), H.263, and MPEG-4. Directly or by implication, these standards may specify certain encoder details, but other encoder details are not specified. Different standards incorporate different techniques, but each standard typically specifies some kind of motion compensation and decompression of prediction residuals. For information, see the respective standard documents.

According to draft JVT-C167 of the H.264 standard, an encoder and decoder may use variable-size transforms. This feature is called adaptive block size transforms ["ABT"], which indicates adaptation of transform size to the block size used for motion compensation in inter coding. For intra coding, the transform size is adapted to the properties of the intra prediction signal. For ABT inter coding, the existing syntax is used. For ABT intra coding, a new symbol is introduced into the macroblock-layer syntax to signal intra prediction mode. For additional information about ABT, see, e.g., section 14 of draft JVT-C167.

To signal the presence of coefficient information when ABT is used, an encoder uses the coded block pattern ["CBP"] syntax element that is also used in non-ABT coding. See, e.g., sections 7.3.18, 8.5.7, and 14.2.4 of draft JVT-C167. A CBP may provide coefficient signaling information on a block-by-block basis for a macroblock, but does not provide such information for specific subblocks. This can be inefficient, for example, if only one subblock for a block has signaled coefficient information.

SUMMARY

Described tools and techniques relate to decoding jointly coded transform type and subblock pattern information. For example, a video decoder decodes a variable length code ["VLC"] that jointly represents transform signal level, transform type, and subblock pattern information, with improved performance in many scenarios.

According to a first aspect of the tools and techniques, a tool such as a decoder receives and decodes a VLC that jointly represents a transform type and subblock pattern. For example, the transform type and subblock pattern are for a motion compensation residual.

According to a second aspect of the tools and techniques, a tool such as a decoder or encoder selects a VLC table from among multiple available VLC tables. Using the selected VLC table, the tool processes a VLC that jointly represents a transform signal level, a transform type and a subblock pattern.

According to a third aspect of the tools and techniques, a tool such as a decoder receives and decodes a first VLC signaled at macroblock level, where the first VLC jointly represents a transform signal level, a transform type and a subblock pattern. The tool also receives and decodes one or more other VLCs signaled at block level, where the one or more other VLCs may each represent a subblock pattern for a block or jointly represents a transform type and a subblock pattern for a block.

According to a fourth aspect of the tools and techniques, a tool such as an encoder encodes and outputs a VLC that jointly represents a transform type and subblock pattern. For example, the transform type and subblock pattern are for a motion compensation residual.

Additional features and advantages will be made apparent from the following detailed description of various embodiments that proceeds with reference to the accompanying drawings.

BRIEF DESCRIPTION OF THE DRAWINGS

FIGS. 6A-6D are diagrams for different syntax layers of a bitstream.

FIGS. 7A-7C are charts showing alternative VLC tables for jointly representing transform signal level, transform type, and subblock pattern information.

FIGS. 8A-8C are charts showing alternative VLC tables for jointly representing transform type and subblock pattern information.

FIGS. 9A-9C are charts showing alternative VLC tables for subblock pattern information.

FIG. 10 is a set of diagrams illustrating different transform sizes.

DETAILED DESCRIPTION

Described embodiments relate to techniques and tools for decoding jointly coded information, for forming bitstreams that include such video information, and for VLC table selection. In particular, signaling mechanisms for variable-size transforms are described, including mechanisms for signaling transform type and subblock status jointly and for using different VLC tables for such signaling at different bit rates. The various techniques and tools can be used in combination or independently.

I. Computing Environment

Figure 1:
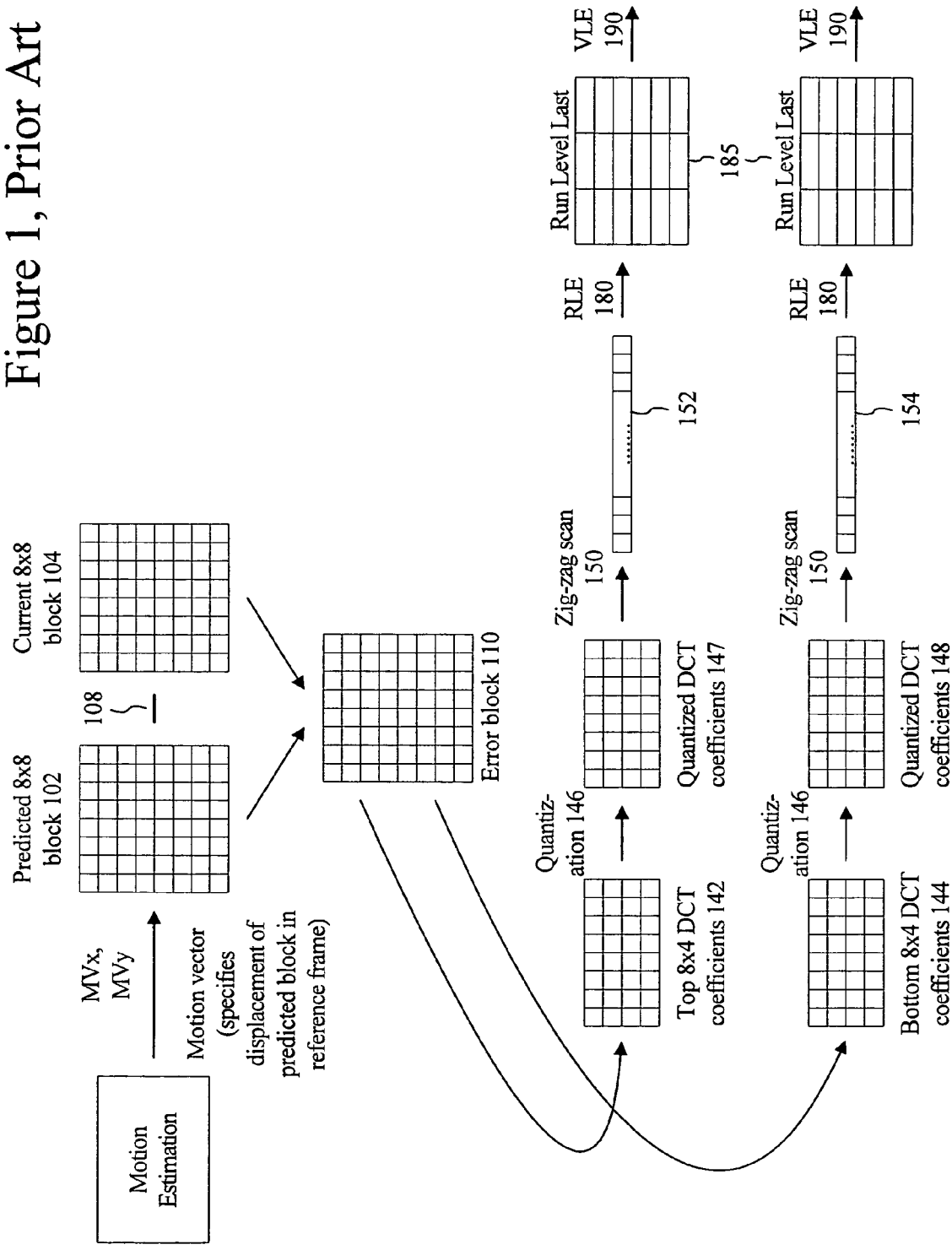
FIG. 1 is a diagram showing transform coding of a prediction residual block with a subblock transform size according to the prior art.
Figure 2:
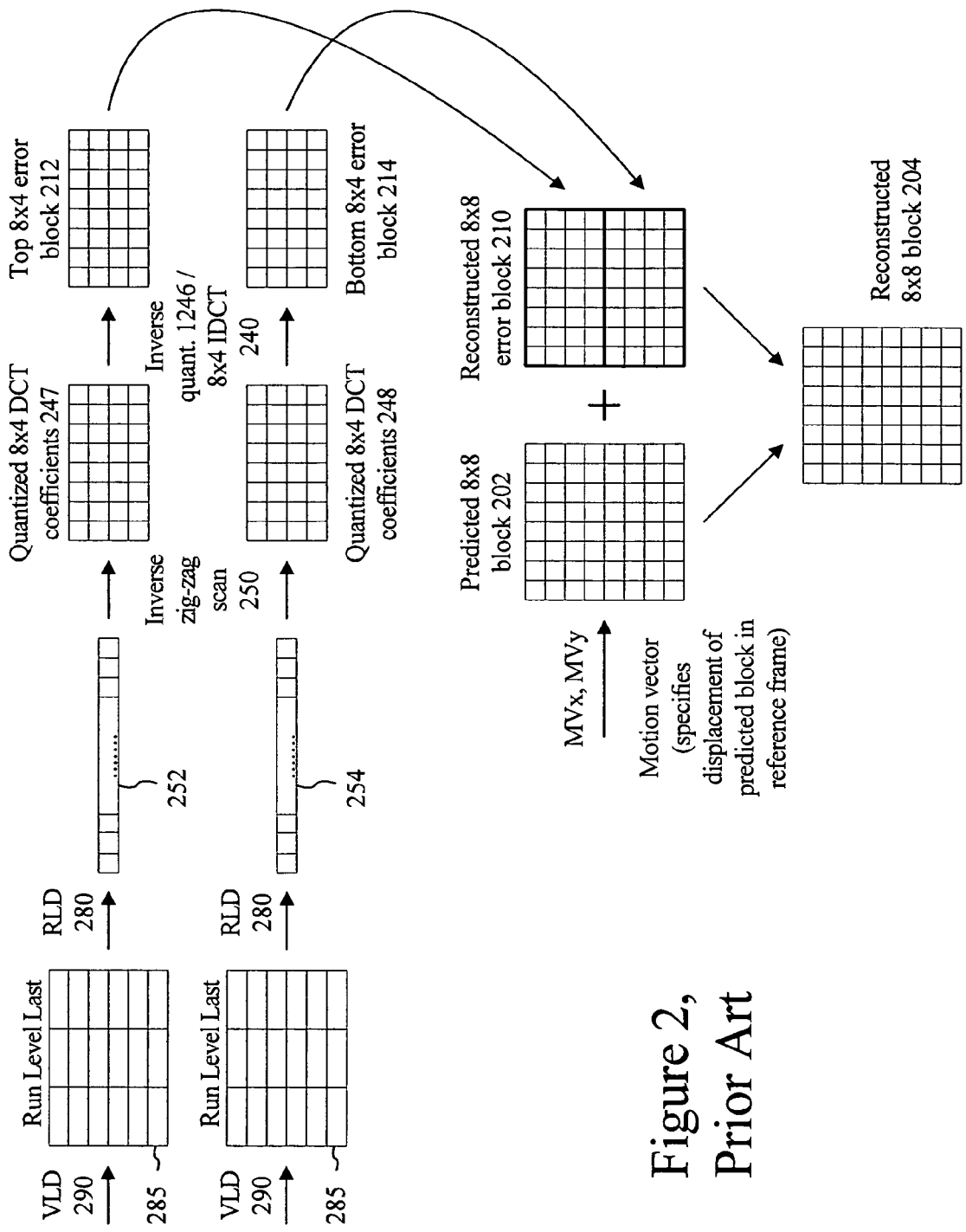
FIG. 2 is a diagram showing inverse transform coding of a prediction residual block with a subblock transform size according to the prior art.
Figure 3:
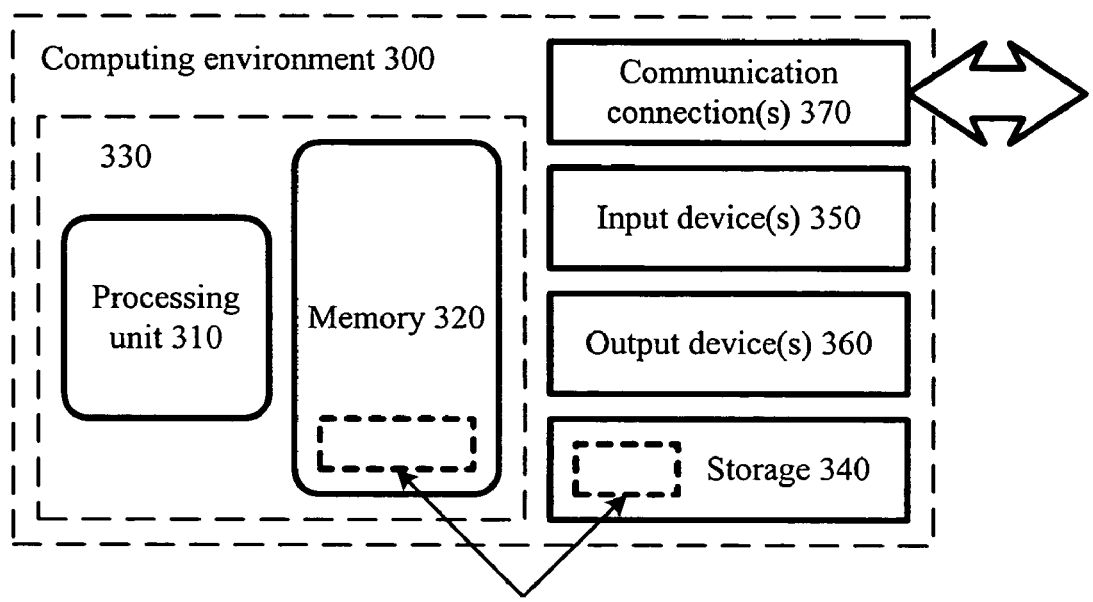
FIG. 3 is a block diagram of a suitable computing environment in which several described embodiments may be implemented.

FIG. 3 illustrates a generalized example of a suitable computing environment (300) in which several of the described embodiments may be implemented. The computing environment (300) is not intended to suggest any limitation as to scope of use or functionality, as the techniques and tools may be implemented in diverse general-purpose or special-purpose computing environments.

With reference to FIG. 3, the computing environment (300) includes at least one processing unit (310) and memory (320). In FIG. 3, this most basic configuration (330) is included within a dashed line. The processing unit (310) executes computer-executable instructions and may be a real or a virtual processor. In a multi-processing system, multiple processing units execute computer-executable instructions to increase processing power. The memory (320) may be volatile memory (e.g., registers, cache, RAM), non-volatile memory (e.g., ROM, EEPROM, flash memory, etc.), or some combination of the two. The memory (320) stores software (380) implementing an encoder and/or decoder with joint coding and/or decoding of transform type and subblock pattern information.

A computing environment may have additional features. For example, the computing environment (300) includes storage (340), one or more input devices (350), one or more output devices (360), and one or more communication connections (370). An interconnection mechanism (not shown) such as a bus, controller, or network interconnects the components of the computing environment (300). Typically, operating system software (not shown) provides an operating environment for other software executing in the computing environment (300), and coordinates activities of the components of the computing environment (300).

The storage (340) may be removable or non-removable, and includes magnetic disks, magnetic tapes or cassettes, CD-ROMs, DVDs, or any other medium which can be used to store information and which can be accessed within the computing environment (300). The storage (340) stores instructions for the software (380) implementing the encoder and/or decoder.

The input device(s) (350) may be a touch input device such as a keyboard, mouse, pen, or trackball, a voice input device, a scanning device, or another device that provides input to the computing environment (300). For audio or video encoding, the input device(s) (350) may be a sound card, video card, TV tuner card, or similar device that accepts audio or video input in analog or digital form, or a CD-ROM or CD-RW that reads audio or video samples into the computing environment (300). The output device(s) (360) may be a display, printer, speaker, CD-writer, or another device that provides output from the computing environment (300).

The communication connection(s) (370) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment (300), computer-readable media include memory (320), storage (340), communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

II. Video Encoder and Decoder

Figure 4:
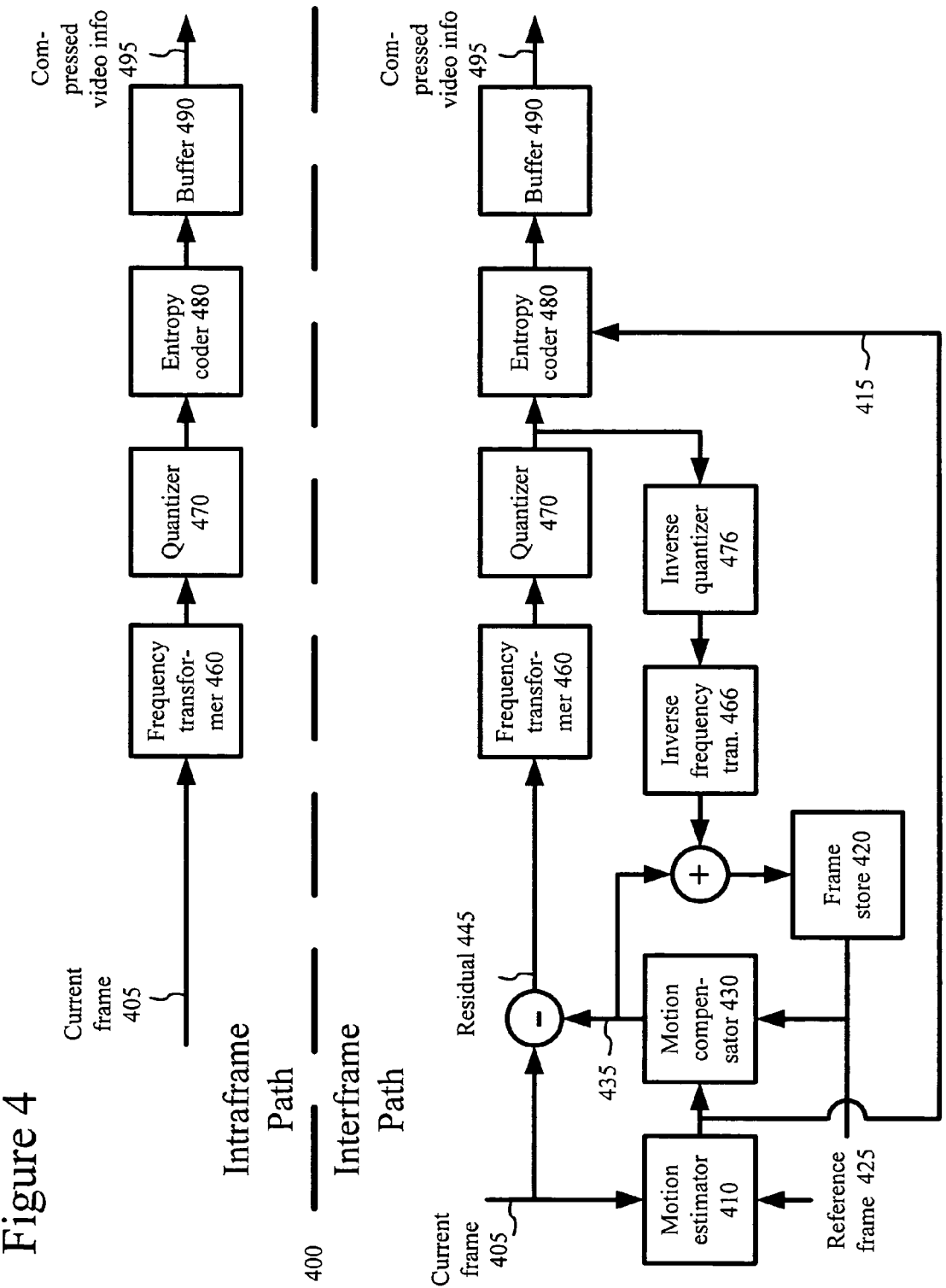
FIGS. 4 and 5 are block diagrams of a video encoder system and a video decoder system, respectively, in conjunction with which several described embodiments may be implemented.
Figure 5:
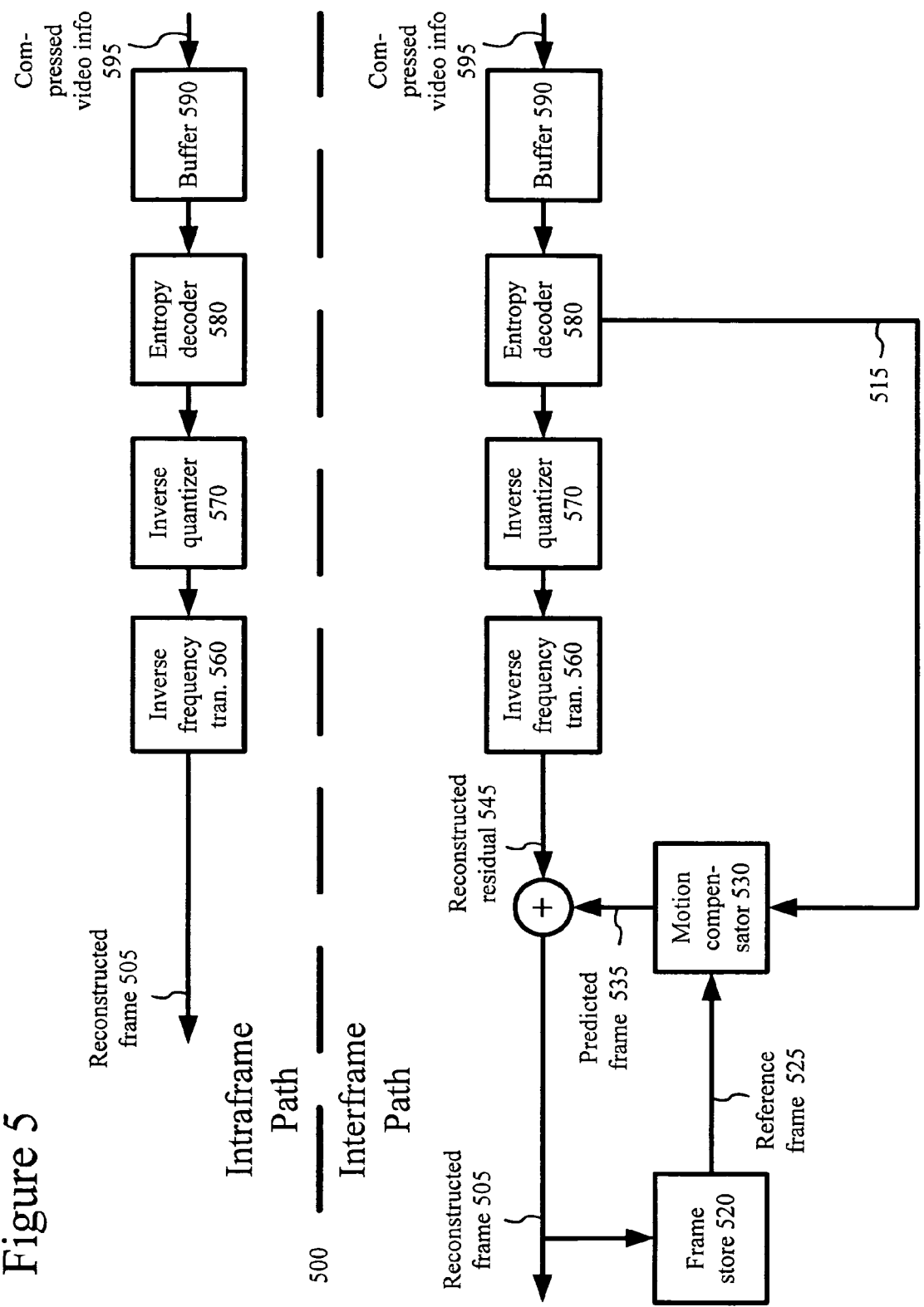

FIG. 4 is a block diagram of a generalized video encoder system (400), and FIG. 5 is a block diagram of a video decoder system (500), in conjunction with which various described embodiments may be implemented.

The relationships shown between modules within the encoder and decoder indicate the main flow of information in the encoder and decoder; other relationships are not shown for the sake of simplicity. In particular, FIGS. 4 and 5 usually do not show side information indicating the encoder settings, modes, tables, etc. used for a video sequence, frame, macroblock, block, etc. Such side information is sent in the output bitstream, typically after entropy encoding of the side information. The format of the output bitstream can be a Windows Media Video version 9 or other format.

The encoder (400) and decoder (500) are block-based and use a 4:2:0 macroblock format, with each macroblock including four 8×8 luminance blocks (at times treated as one 16×16 macroblock) and two 8×8 chrominance blocks. Alternatively, the encoder (400) and decoder (500) are object-based, use a different macroblock or block format, or perform operations on sets of pixels of different size or configuration than 8×8 blocks and 16×16 macroblocks.

Depending on implementation and the type of compression desired, modules of the encoder or decoder can be added, omitted, split into multiple modules, combined with other modules, and/or replaced with like modules. In alternative embodiments, encoders or decoders with different modules and/or other configurations of modules perform one or more of the described techniques.

A. Video Encoder

FIG. 4 is a block diagram of a general video encoder system (400) that can perform joint entropy coding and bitstream formation operations for variable-size transform information. The encoder system (400) receives a sequence of video frames including a current frame (405), and produces compressed video information (495) as output. Particular embodiments of video encoders typically use a variation or supplemented version of the generalized encoder (400).

The encoder system (400) compresses predicted frames and key frames. For the sake of presentation, FIG. 4 shows a path for key frames through the encoder system (400) and a path for forward-predicted frames. Many of the components of the encoder system (400) are used for compressing both key frames and predicted frames. The exact operations performed by those components can vary depending on the type of information being compressed.

A predicted frame (also called p-frame, b-frame for bi-directional prediction, or inter-coded frame) is represented in terms of prediction (or difference) from one or more other frames. A prediction residual is the difference between what was predicted and the original frame. In contrast, a key frame (also called an I-frame or intra-coded frame) is compressed without reference to other frames.

If the current frame (405) is a forward-predicted frame, a motion estimator (410) estimates motion of macroblocks or other sets of pixels of the current frame (405) with respect to a reference frame, which is a reconstructed previous frame (425) buffered in the frame store (420). In alternative embodiments, the reference frame is a later frame or the current frame is bi-directionally predicted. The motion estimator (410) can estimate motion by pixel, ½ pixel, ¼ pixel, or other increments, and can switch the resolution of the motion estimation on a frame-by-frame basis or other basis. The resolution of the motion estimation can be the same or different horizontally and vertically. The motion estimator (410) outputs as side information motion information (415) such as motion vectors. A motion compensator (430) applies the motion information (415) to the reconstructed previous frame (425) to form a motion-compensated current frame (435). The prediction is rarely perfect, however, and the difference between the motion-compensated current frame (435) and the original current frame (405) is the prediction residual (445). Alternatively, a motion estimator and motion compensator apply another type of motion estimation/compensation.

For jointly coded transform signal level, transform type, and subblock pattern information, the encoder (400) jointly codes and signals the information using a syntax and code tables such as those described below.

A frequency transformer (460) converts the spatial domain video information into frequency domain (i.e., spectral) data. For block-based video frames, the frequency transformer (460) applies a DCT or variant of DCT to blocks of the pixel data or prediction residual data, producing blocks of DCT coefficients. Alternatively, the frequency transformer (460) applies another conventional frequency transform such as a Fourier transform or uses wavelet or subband analysis. For example, the frequency transform (460) applies a fast, 16-bit frequency transform. In embodiments in which the encoder uses spatial extrapolation (not shown in FIG. 4) to encode blocks of key frames, the frequency transformer (460) can apply a re-oriented frequency transform such as a skewed DCT to blocks of prediction residuals for the key frame. The frequency transformer (460) applies an 8×8, 8×4, 4×8, 4×4, or other size frequency transforms to prediction residuals for predicted frames.

A quantizer (470) then quantizes the blocks of spectral data coefficients. The quantizer applies uniform, scalar quantization to the spectral data with a step-size that varies on a frame-by-frame basis or other basis. Alternatively, the quantizer applies another type of quantization to the spectral data coefficients, for example, a non-uniform, vector, or non-adaptive quantization, or directly quantizes spatial domain data in an encoder system that does not use frequency transformations. In addition to adaptive quantization, the encoder (400) can use frame dropping, adaptive filtering, or other techniques for rate control.

If a given macroblock in a predicted frame has no information of certain types (e.g., no motion information for the macroblock and no residual information), the encoder (400) may encode the macroblock as a skipped macroblock. If so, the encoder signals the skipped macroblock in the output bitstream of compressed video information (495).

When a reconstructed current frame is needed for subsequent motion estimation/compensation, an inverse quantizer (476) performs inverse quantization on the quantized spatial frequency coefficients. An inverse frequency transformer (466) then performs the inverse of the operations of the frequency transformer (460), producing a reconstructed prediction residual (for a predicted frame) or a reconstructed key frame. If the current frame (405) was a key frame, the reconstructed key frame is taken as the reconstructed current frame (not shown). If the current frame (405) was a predicted frame, the reconstructed prediction residual is added to the motion-compensated current frame (435) to form the reconstructed current frame. The frame store (420) buffers the reconstructed current frame for use in predicting a next frame. In some embodiments, the encoder applies a deblocking filter to the reconstructed frame to adaptively smooth discontinuities between the blocks of the frame.

The entropy coder (480) compresses the output of the quantizer (470) as well as certain side information (e.g., motion information (415), spatial extrapolation modes, quantization step size). Typical entropy coding techniques include arithmetic coding, differential coding, Huffman coding, run length coding, LZ coding, dictionary coding, and combinations of the above. The entropy coder (480) typically uses different coding techniques for different kinds of information (e.g., DC coefficients, AC coefficients, different kinds of side information), and can choose from among multiple code tables within a particular coding technique.

The entropy coder (480) puts compressed video information (495) in the buffer (490). A buffer level indicator is fed back to bit rate adaptive modules. The compressed video information (495) is depleted from the buffer (490) at a constant or relatively constant bit rate and stored for subsequent streaming at that bit rate. Therefore, the level of the buffer (490) is primarily a function of the entropy of the filtered, quantized video information, which affects the efficiency of the entropy coding. Alternatively, the encoder system (400) streams compressed video information immediately following compression, and the level of the buffer (490) also depends on the rate at which information is depleted from the buffer (490) for transmission.

Before or after the buffer (490), the compressed video information (495) can be channel coded for transmission over the network. The channel coding can apply error detection and correction data to the compressed video information (495).

B. Video Decoder

FIG. 5 is a block diagram of a general video decoder system (500). The decoder system (500) receives information (595) for a compressed sequence of video frames and produces output including a reconstructed frame (505). Particular embodiments of video decoders typically use a variation or supplemented version of the generalized decoder (500).

The decoder system (500) decompresses predicted frames and key frames. For the sake of presentation, FIG. 5 shows a path for key frames through the decoder system (500) and a path for forward-predicted frames. Many of the components of the decoder system (500) are used for decompressing both key frames and predicted frames. The exact operations performed by those components can vary depending on the type of information being decompressed.

A buffer (590) receives the information (595) for the compressed video sequence and makes the received information available to the entropy decoder (580). The buffer (590) typically receives the information at a rate that is fairly constant over time, and includes a jitter buffer to smooth short-term variations in bandwidth or transmission. The buffer (590) can include a playback buffer and other buffers as well. Alternatively, the buffer (590) receives information at a varying rate. Before or after the buffer (590), the compressed video information can be channel decoded and processed for error detection and correction.

The entropy decoder (580) entropy decodes entropy-coded quantized data as well as entropy-coded side information (e.g., motion information (515), spatial extrapolation modes, quantization step size), typically applying the inverse of the entropy encoding performed in the encoder. Entropy decoding techniques include arithmetic decoding, differential decoding, Huffman decoding, run length decoding, LZ decoding, dictionary decoding, and combinations of the above. The entropy decoder (580) frequently uses different decoding techniques for different kinds of information (e.g., DC coefficients, AC coefficients, different kinds of side information), and can choose from among multiple code tables within a particular decoding technique.

If the frame (505) to be reconstructed is a forward-predicted frame, a motion compensator (530) applies motion information (515) to a reference frame (525) to form a prediction (535) of the frame (505) being reconstructed. For example, the motion compensator (530) uses a macroblock motion vector to find a macroblock in the reference frame (525). A frame buffer (520) stores previous reconstructed frames for use as reference frames. The motion compensator (530) can compensate for motion at pixel, ½ pixel, ¼ pixel, or other increments, and can switch the precision of the motion compensation on a frame-by-frame basis or other basis. The precision of the motion compensation can be the same or different horizontally and vertically. Alternatively, a motion compensator applies another type of motion compensation. The prediction by the motion compensator is rarely perfect, so the decoder (500) also reconstructs prediction residuals.

When the decoder needs a reconstructed frame for subsequent motion compensation, the frame store (520) buffers the reconstructed frame for use in predicting a next frame. In some embodiments, the encoder applies a deblocking filter to the reconstructed frame to adaptively smooth discontinuities between the blocks of the frame.

An inverse quantizer (570) inverse quantizes entropy-decoded data. In general, the inverse quantizer applies uniform, scalar inverse quantization to the entropy-decoded data with a step-size that varies on a frame-by-frame basis or other basis. Alternatively, the inverse quantizer applies another type of inverse quantization to the data, for example, a non-uniform, vector, or non-adaptive inverse quantization, or directly inverse quantizes spatial domain data in a decoder system that does not use inverse frequency transformations.

An inverse frequency transformer (560) converts the quantized, frequency domain data into spatial domain video information. For block-based video frames, the inverse frequency transformer (560) applies an IDCT or variant of IDCT to blocks of the DCT coefficients, producing pixel data or prediction residual data for key frames or predicted frames, respectively. Alternatively, the frequency transformer (560) applies another conventional inverse frequency transform such as a Fourier transform or uses wavelet or subband synthesis. For example, the inverse frequency transform (560) applies a fast, 16-bit inverse frequency transform. In embodiments in which the decoder uses spatial extrapolation (not shown in FIG. 5) to decode blocks of key frames, the inverse frequency transformer (560) can apply a re-oriented inverse frequency transform such as a skewed IDCT to blocks of prediction residuals for the key frame. The inverse frequency transformer (560) applies an 8×8, 8×4, 4×8, 4×4 or other size inverse frequency transforms to prediction residuals for predicted frames.

The decoder (500) processes VLCs for jointly coded transform signal level, transform type, and subblock pattern information, for example, as described below.

III. Example Bitstream Syntax and Semantics

An example bitstream includes information for a sequence of compressed progressive video frames or other pictures. The bitstream is organized into several hierarchical layers that are decoded by a decoder such as the decoder (500) of FIG. 5. The highest layer is the sequence layer, which has information for the overall sequence of frames. Additionally, each compressed video frame is made up of data that is structured into three hierarchical layers. From top to bottom the layers are: picture, macroblock, and block.

Figure 6A:
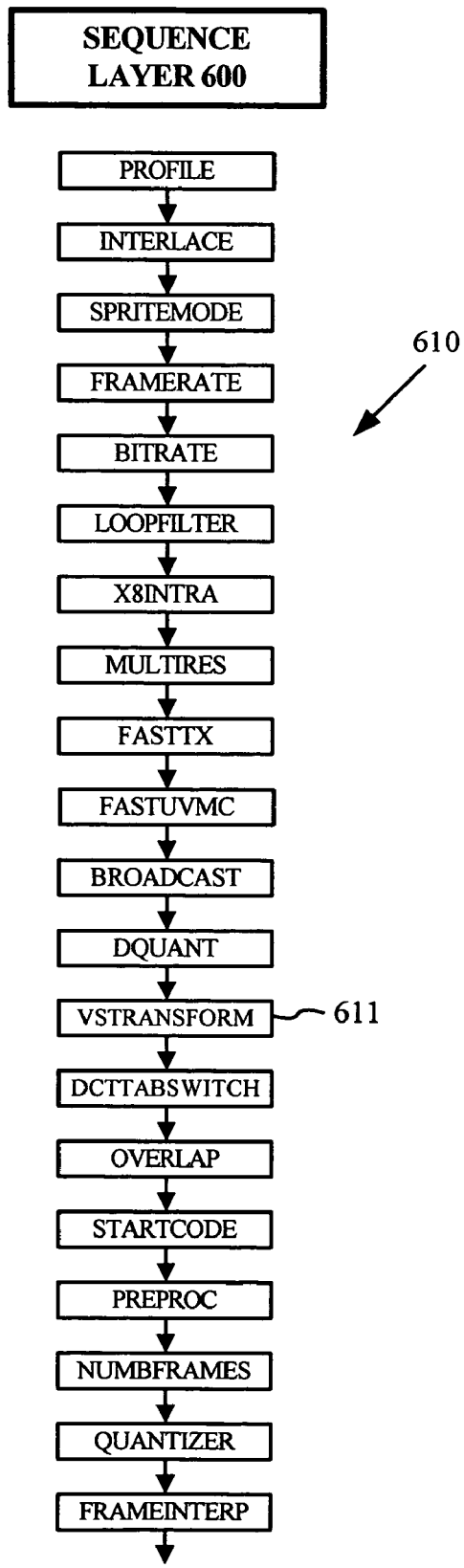
Figure 6B:
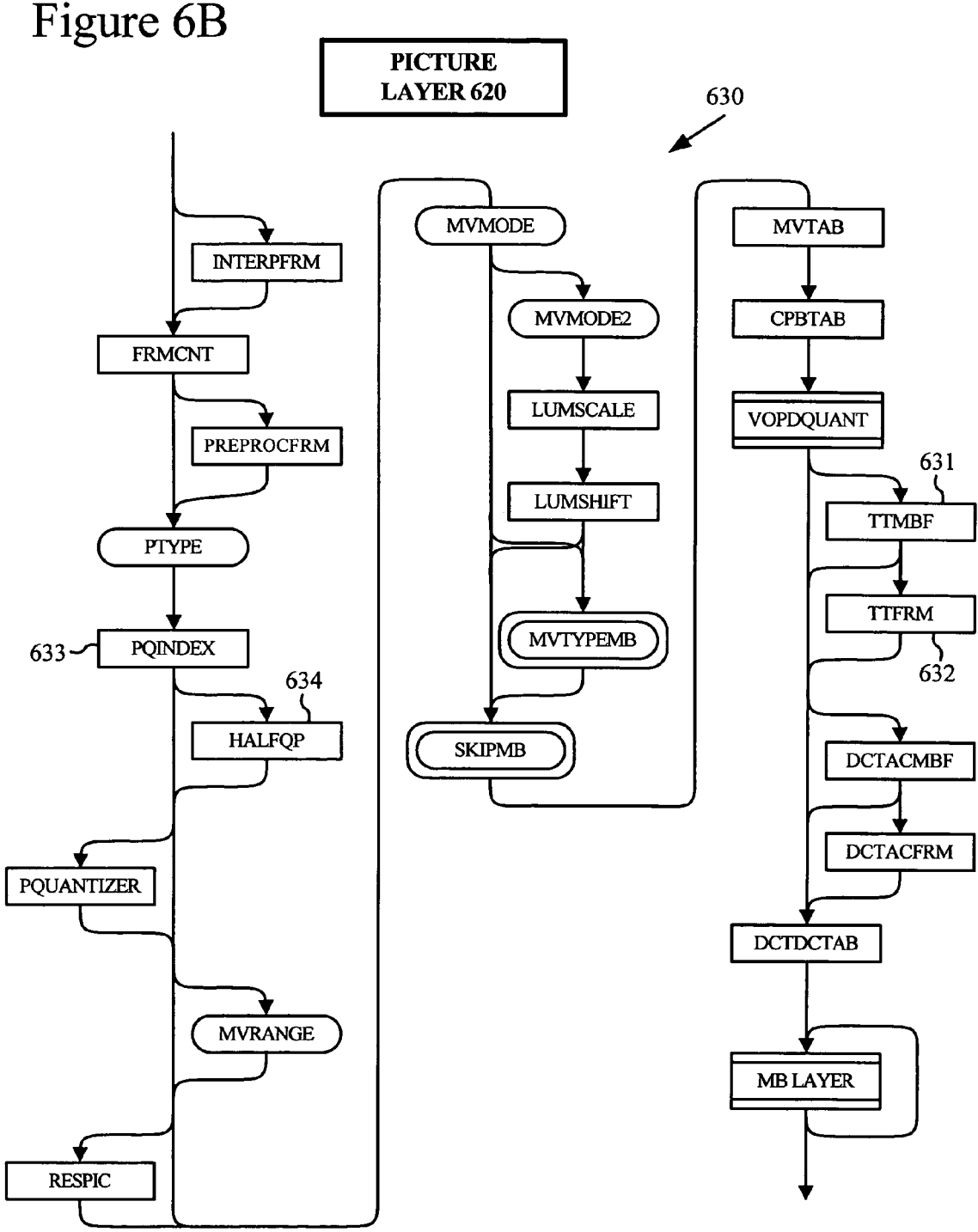

FIG. 6A is a syntax diagram for the sequence layer (600), which includes a sequence header (610) followed by data for the picture layer (see FIG. 6B). The sequence header (610) includes several sequence-level elements that are processed by the decoder and used to decode the sequence, including a VSTRANSFORM element (611). VSTRANSFORM (611) is a 1-bit field that indicates whether variable-sized transform coding is enabled for the sequence. If VSTRANSFORM (611) equals 0, variable-sized transform coding is not enabled for the sequence. If it equals 1, variable-sized transform coding is enabled for the sequence.

The sequence header (610) also includes a PROFILE element and a FASTTX element. PROFILE is a 2-bit field that specifies the encoding profile used to produce a clip. Different profiles place different restrictions on the use of various compression tools. FASTTX is a 1-bit field that indicates whether a fast transform (which is different than DCT/IDCT) is used for the encoding/decoding. If FASTTX =1, then the fast inverse transform is used in place of the normal IDCTs in decoding. In some profiles, the decoder always uses the fast inverse transform. In another profile, the decoder can use either the normal IDCT or the fast inverse transform.

FIG. 6B is a syntax diagram for the picture layer (620) for a progressive forward-predicted frame ["progressive P-frame"]. Syntax diagrams for other pictures, such as interlaced P-pictures and progressive B-frames have many similar syntax elements. The picture layer (620) includes a picture header (630) followed by data for the macroblock layer. The picture header (630) includes several picture-level elements that are processed by the decoder and used to decode the corresponding frame. Some of those elements are only present if their presence is signaled or implied by a sequence-level element or a preceding picture-level element.

For example, the picture header (630) includes a macroblock-level transform type flag ["TTMBF"] element (631). TTMBF (631) is a 1-bit field present in P-picture and B-picture headers if VSTRANSFORM (611) equals 1. TTMBF (631) signals whether transform type signaling is at the frame level or at another (i.e., macroblock and/or block) level. If TTMBF (631) equals 0, the same transform type is used for all coded blocks in the frame, and that transform type is specified by the frame-level transform type ["TTFRM"] element (632) that follows in the picture layer (620). TTFRM (632) is a 2-bit fixed length code present (as noted above) in P-picture and B-picture headers if VSTRANSFORM (611) equals 1 and TTMBF (631) equals 0. TTFRM indicates a transform type for coded blocks of the frame as shown in Table 3.

TABLE 3

| Transform type from TTFRM | |
|---|---|
| FLC | Transform Type |
| 00 | 8×8 Transform |
| 01 | 8×4 Transform |
| 10 | 4×8 Transform |
| 11 | 4×4 Transform |

If TTMBF (631) equals 1, TTFRM (632) is not present. Instead, the transform type may vary within the frame, and the transform type is signaled at the macroblock and/or block levels.

Aside from TTMBF (631) and TTFRM (632), the picture header (630) includes several elements that affect subsequent variable-size transform switching. The picture quantizer index["PQINDEX"] element (633) is a 5-bit field that signals a quantizer scale index for the frame. PQINDEX (633) specifies a picture quantizer scale (PQUANT) with a value of "NA" or an integer in the range of 1 to 31. The half QP step ["HALFQP"] element (634) is a 1-bit field present if QPINDEX (633) is less than or equal to 8. HALFQP (634) allows the picture quantizer to be expressed in half step increments over the low PQUANT range.

FIG. 6C is a macroblock-layer (640) bitstream syntax diagram for progressive P-frames. Data for a macroblock consists of a macroblock header that may be followed by block-layer data. More specifically, FIG. 6C illustrates two patterns of macroblock headers. The non-skipped 1MV macroblock header (650) is a header for a macroblock that is not skipped and has one motion vector for the macroblock. The non-skipped 4MV macroblock header (651) is a header for a macroblock that is not skipped and has up to four motion vectors, one for each of the four blocks of the macroblock. The headers for skipped 1MV macroblocks and skipped 4MV macroblocks are not shown.

The coded block pattern ["CBPCY"] (652) is a variable-size field present in P-picture macroblock layers. For a 1MV macroblock, CBPCY (652) indicates which blocks of the macroblock have at least one non-zero coefficient. For a 4MV macroblock, the semantic of CBPCY (652) is slightly different, as described below.

The macroblock-level transform type ["TTMB"] element (653) is a variable length field present in P-picture and B-picture macroblocks if the picture-layer field TTMBF (631) is 1. As shown in the tables of FIGS. 7A-7C, TTMB (653) specifies a signal level, transform type, and subblock pattern. If the signal level is macroblock, the transform type decoded from TTMB (653) is used to decode all coded blocks in the macroblock. If the signal level is block, the transform type decoded from TTMB (653) is used to decode the first coded block in the macroblock, and the transform type(s) of the remaining coded blocks are signaled at block level. When the transform type is 8×4 or 4×8, the subblock pattern decoded from TTMB (653) indicates the subblock pattern of the first coded block. The table used to encode and decode TTMB (653) depends on the value of PQUANT. For PQUANT less than or equal to 4, the VLC table shown in FIG. 7A is used. For PQUANT greater than 4 and less than or equal to 12, the VLC table shown in FIG. 7B is used. For PQUANT greater than 12, the VLC table shown in FIG. 7C is used.

The block-level motion vector data ["BLKMVDATA"] element (654) is a variable-size field present in certain situations, as described below. It contains motion information for a block.

Figure 6D:
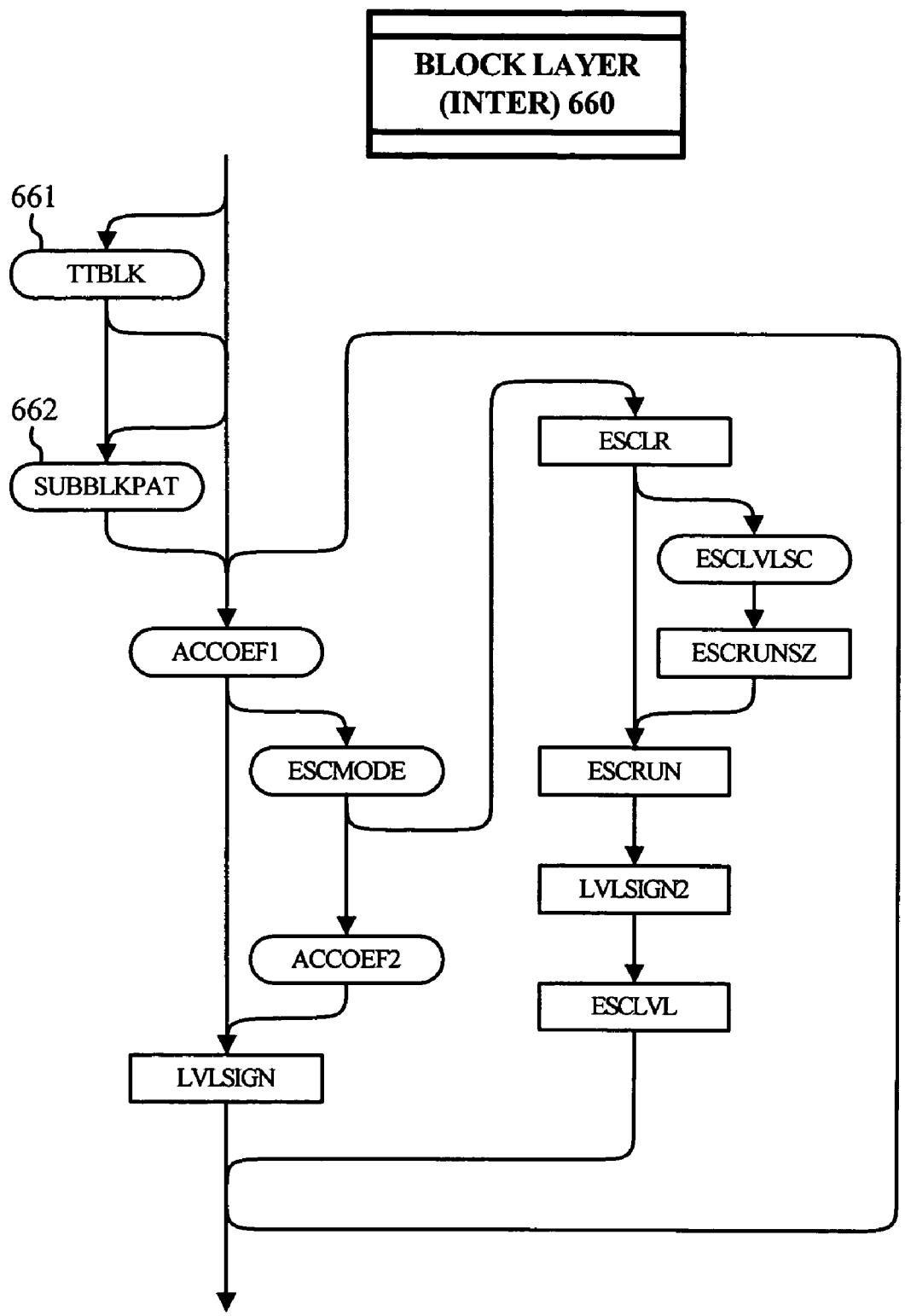

FIG. 6D illustrates a block-layer (660) bitstream syntax diagram for an inter-coded block. The block-level transform type ["TTBLK"] element (661) is a variable-size field present only in inter-coded blocks and only if the macroblock-level TTMB (653) indicates that the signaling level is block. An 8×8 error block can be transformed using an 8×8 transform, up to two 8×4 transforms, up to two 4×8 transforms, or up to four 4×4 transforms. TTBLK (661) codes the transform type for the block as well as the subblock pattern if the transform type is 8×4 or 4×8. The table used to encode and decode TTBLK (661) again depends on the value of PQUANT. If PQUANT is less than or equal to 4, the VLC table shown in FIG. 8A is used. If PQUANT is greater than 4 and less than or equal to 12 the VLC table shown in FIG. 8B is used. If PQUANT is greater than 12 the VLC table shown in FIG. 8C is used. TTBLK (661) is not present for the first coded block in each macroblock since the transform type and subblock pattern decoded in TTMB (653) for the macroblock are used for the first coded block. TTBLK (661) is present for each coded block after the first.

The subblock pattern ["SUBBLKPAT"] element (662) is a variable-size field present for an inter-coded block if the transform type for the block is 8×4, 4×8, or 4×4 and if the subblock pattern for the block is not otherwise indicated by TTMB (653) or TTBLK (661).

For 4×4 transform type, SUBBLKPAT (662) indicates which of the four 4×4 subblocks of the block have at least one non-zero coefficient. SUBBLKPAT (662) is decoded to a 4-bit field. Each bit in the 4-bit field indicates whether a corresponding 4×4 subblock contains at least one non-zero coefficient as follows: 8*SB0+4*SB1+2*SB2+SB3, where SB0 is the top left 4×4 subblock of the block, SB1 is the top right subblock, SB2 is the bottom left subblock, and SB3 is the bottom right subblock. For each subblock, the bit is 0 if the subblock does not contain any non-zero coefficients and 1 if the subblock contains at least one non-zero coefficient. FIGS. 9A-9C show alternative tables for representing the 4-bit value with a VLC, where the table used depends on the value of PQUANT.

For 8×4 or 4×8 transform type, SUBBLKPAT (662) when signaled specifies which of the two subblocks of an 8×8 error block have at least one non-zero coefficient. SUBBLKPAT (662) is encoded and decoded with the VLC table shown in Table 2, in which an X indicates that the subblock contains at least one non-zero coefficient.

If the subblock pattern indicates that a subblock contains at least one non-zero coefficient, encoded coefficient information is present for the subblock. Various remaining elements of the block layer (660) signal run, level, and last information for encoded coefficients when present.

IV. Decoding Jointly Coded Transform Type and Subblock Pattern

For typical inter-coded blocks, a decoder such as the decoder (500) of FIG. 5 selects transform type(s), decodes subblock patterns, decodes coefficients, performs inverse quantization, and performs an inverse transform. The decoder obtains predicted blocks (or macroblocks) by motion compensation. To reconstruct the inter-coded blocks, the decoder combines the error and predicted blocks.

When the decoder follows the syntax of FIGS. 6A-6D, if variable-sized transform coding is enabled for a sequence, the decoder may use variable-size transforms for the sequence. If variable-size transform coding is not enabled, an 8×8 transform is used for all blocks. For variable-size transforms, an 8×8 error block can be transformed using one 8×8 transform, two 8×4 transforms, two 4×8 transforms, or four 4×4 transforms, as shown in FIG. 10. The transform type is signaled at the picture, macroblock, or block level.

At the frame level, the decoder processes TTMBF (631) for a current frame to determine whether transform type signaling is at the frame level or another level. If transform type signaling is at frame level, the decoder processes TTFRM (632) to determine the transform type for the residual blocks of the frame. If transform type signaling is not at frame level, the decoder processes jointly coded information signaled at macroblock level for a transform type signal level, transform type, and subblock pattern. The decoder may also process jointly coded information signaled at block level for transform type and subblock pattern. The decoder may switch VLC tables when processing the jointly coded information.

A. Decoding Macroblock-Level Signals

At the macroblock level for a progressive P-frame, the presence of coefficient information for subblocks and blocks of a macroblock is signaled by a combination of CBPCY (652), TTMB (653), and/or BLKMVDATA (654).

CBPCY (652) is used differently depending on whether the macroblock is 1MV or 4MV. A 1MV macroblock is one where a single motion vector data ["MVDATA"] field is associated with all blocks in the macroblock. MVDATA signals whether the blocks are coded as intra or inter type. If they are coded as inter, then MVDATA also indicates information for the motion vector differential. CBPCY (652) is present in the 1MV macroblock layer if MVDATA indicates: (1) the macroblock is inter-coded, and (2) at least one block of the macroblock contains coefficient information (indicated by a 'last' value decoded from MVDATA). If CBPCY (652) is present, it decodes to a 6-bit field indicating which of the six blocks of the macroblock contain at least one non-zero coefficient. A '1' in a bit position indicates that a corresponding inter-coded block has at least one non-zero coefficient.

CBPCY (652) is always present in the 4MV macroblock layer. The CBPCY bit positions for the four luminance blocks (bits 0-3) have a slightly different meaning than the bit positions for the two chrominance blocks (bits 4 and 5). For a luminance block, a '0' indicates that the block does not contain motion vector information or any non-zero coefficients. In this case, BLKMVDATA (654) is not present for the block, a predicted motion vector is used as the motion vector for the block, and there is no residual data for the block. A '1' in the bit position for a luminance block indicates that BLKMVDATA (654) is present for the block. BLKMVDATA (654) indicates whether the block is inter or intra-coded. If it is inter coded, BLKMVDATA (654) contains information for the motion vector differential, and a 'last' flag indicates whether additional coefficient information is present for the block. For an inter-coded chrominance block, a '1' in the bit position for the block indicates that the block has at least one non-zero coefficient, etc.

If frame-level transform type signaling is not used, and at least one non-zero coefficient is present for a block of a macroblock, information is sent to indicate a transform type and subblock pattern. TTMB (653) jointly encodes a transform type, signaling mode and subblock pattern. If the signaling mode is macroblock signaling, the transform type decoded from TTMB (653) is used for all blocks in the macroblock that contain block residual information. If the signaling mode is block signaling, the transform type from TTMB (653) is applied to the first coded block in the macroblock, and the transform types for the remaining coded blocks are signaled at the block level.

If TTMB (653) indicates that the transform type is 8×4 or 4×8, a subblock pattern is also decoded from TTMB (653). The subblock pattern applies to the first coded block in the macroblock, and the subblock patterns for the remaining coded blocks are signaled at the block level.

B. Decoding Block-Level Signals

If TTMB (653) indicates the signal level is block level then the transform type is signaled at block level. For a block that contains residual information, TTBLK (661) indicates the transform type used for the block, as decoded using one of the tables shown in FIGS. 8A-8C. TTBLK (661) is not present for the first coded block since transform type for that block is joint coded in TTMB (653). TTBLK (661) is present for all the remaining coded blocks and indicates the transform type. If the transform type is 8×4, 4×8 or 4×4, the decoder needs information about which subblocks have non-zero coefficients. If the transform type is 8×4 or 4×8, the subblock pattern is decoded as part of TTMB (653) (for the first coded block) or TTBLK (661) (for each remaining coded block after the first one). If the transform type is 4×4, the subblock pattern is encoded in SUBBLKPAT (662) at the block level for each coded block, as shown in FIG. 6D and described above.

If the transform type signaling level is macroblock level and the transform type is 8×4, 4×8, or 4×4, the decoder may still need information about which subblocks have non-zero coefficients. If the transform type is 8×4 or 4×8, the subblock pattern is decoded as part of TTMB (653) (for the first coded block) or SUBBLKPAT (662) (for each remaining coded block). If the transform type is 4×4, the subblock pattern is encoded in SUBBLKPAT (662) at the block level for each coded block.

Finally, if the transform type signaling level is frame level and the transform type is 8×4, 4×8, or 4×4, the decoder needs information about which subblocks have non-zero coefficients. The subblock pattern is encoded in SUBBLKPAT (662) at the block level for each coded block.

If a subblock pattern indicates no non-zero coefficients are present for a subblock, then no additional coefficient information for that subblock is present in the bitstream. For an 8×4 transform type, data for the top subblock (if present) is coded first followed by data for the bottom subblock (if present). For a 4×8 transform type, data for the left subblock (if present) is coded first followed by data for the right subblock (if present). For a 4×4 transform type, data for the upper left subblock is coded first (if present) followed, in order, by data for the upper right, lower left and lower right subblocks (if present).

C. Decoding Coefficients and Reconstructing Macroblocks

When coefficient information is present for a subblock or block, the decoder reconstructs coefficients from run/level/last information signaled for the subblock or block. Specifically, the decoder reconstructs a one-dimensional array with 16 elements (for a 4×4 sunblock), 32 elements (for an 8×4 or 4×8 subblock), or 64 elements (for an 8×8 block). The decoder applies a zigzag scan pattern to scan the coefficients into a two-dimensional array with dimensions of 4×4, 4×8, 8×4, or 8×8, inverse quantizes the coefficients, and performs an inverse transform on the coefficients two-dimensional array. For the inverse transform, the decoder uses a 4×4, 4×8, 8×4, or 8×8 size, depending on the size of the subblock or block.

V. Progressive B-Frames

For progressive B-frames, the decoder performs similar parsing and decoding of transform type signal level, transform type, and subblock pattern information. Many syntax elements of the picture and macroblock layers for a progressive P-frame are also present for a progressive B-frame and have the same semantics. Both progressive P-frames and progressive B-frames follow the same block-level syntax and semantics for inter-coded blocks.

VI. Theory and Results

Under various circumstances, a weakness of WMV8 signaling for variable-size transforms is that event spaces for signaled events are very small. At the macroblock level in WMV8, for example, the signaling level event space has two options (block or macroblock) and the transform type event space has three options (8×8, 8×4, or 4×8). In various techniques and tools described herein, to increase the event space, several events are jointly encoded at the macroblock level, including: (1) signaling level (block or macroblock); (2) transform type (for all blocks within the macroblock if macroblock-level signaling is used, for the first coded block in the macroblock if block-level signaling is used); and (3) the subblock pattern for the first coded block if the transform type is 8×4 or 4×8. This increases the event space to 16 options, as reflected in the tables of FIGS. 7A-7C. Each of the three tables in FIGS. 7A-7C covers a range of PQUANT. The probability distribution for the 16 options changes with PQUANT, so this allows for efficient coding of the macroblock-level events throughout the entire PQUANT range.

At the block level in WMV8, the event spaces for the signaled events (transform type, subblock pattern) are again too small for efficient separate coding in many cases. In various techniques and tools described herein, the event space is increased to 8 by jointly coding (1) the transform type and (2) the subblock pattern if the transform type is 8×4 or 4×8. The 8 events are reflected in the tables of FIGS. 8A-8C. Each of the three tables in FIGS. 8A-8C covers a range of PQUANT. The probability distribution for the 8 events changes with PQUANT, so this allows for efficient coding of the block-level events throughout the entire PQUANT range.

Having described and illustrated the principles of my invention, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of my invention may be applied, I claim as my invention all such embodiments as may come within the scope and spirit of the following claims and equivalents thereto.

I claim:

1. A method for transforming encoded video information using a computing device that implements a video decoder, the method comprising:
   with the computing device that implements the video decoder:
      receiving encoded data in a bit stream, wherein the encoded data includes a single variable length code (VLC) jointly representing a transform type and subblock pattern; and reconstructing a video frame, the video frame including a macroblock with plural blocks, the plural blocks including a first block that is coded, and the first block including plural subblocks, wherein the reconstructing includes decoding the VLC to determine the transform type and the subblock pattern, and wherein:

the transform type indicates a transform size that applies for the plural subblocks of the first block, the transform type further indicating how the first block is split into the plural subblocks; and the subblock pattern indicates which of the plural subblocks of the first block have at least one non-zero coefficient.

2. The method of claim 1 wherein the transform type applies for only the first block and the subblock pattern is for the first block.

3. The method of claim 1 wherein the VLC further jointly represents a transform type signal level.

4. The method of claim 3 wherein the transform type signal level is macroblock level, the transform type applies for each of the plural blocks of the macroblock, and the subblock pattern is for the first block of the macroblock.

5. The method of claim 3 wherein the transform type signal level is block level, the transform type applies for only the first block, and the subblock pattern is for the first block.

6. The method of claim 3 wherein the VLC is signaled at macroblock level.

7. The method of claim 1 wherein the VLC is signaled at block level.

8. The method of claim 1 further comprising, as part of the reconstructing, selecting a VLC table from among multiple VLC tables, wherein the decoding the VLC uses the selected VLC table.

9. The method of claim 8 wherein the selecting is based at least in part upon a quantization level.

10. The method of claim 1 wherein the transform type and the subblock pattern are for a motion compensation residual.

11. The method of claim 1 further comprising outputting the video frame.

12. A method for transforming encoded video information using a computing device that implements a video decoder, the method comprising:

with the computing device that implements the video decoder:

receiving encoded data in a bit stream, wherein the encoded data includes a single variable length code (VLC) jointly representing a transform type signal level, a transform type and a subblock pattern; and reconstructing a video frame, the video frame including a macroblock with plural blocks, the plural blocks including a first block that is coded, and the first block including plural subblocks, wherein the reconstructing includes:

selecting a VLC table from among multiple available VLC tables; and using the selected VLC table to decode the VLC that jointly represents the transform type signal level, the transform type and the subblock pattern, wherein:

the transform type indicates a transform size that applies for the plural subblocks of the first block, the transform type further indicating how the first block is split into the plural subblocks; and the subblock pattern indicates which of the plural subblocks of the first block have at least one non-zero coefficient.

13. The method of claim 12 wherein the selecting is based at least in part upon a quantization level.

14. The method of claim 13 wherein the quantization level is derived from one or more picture-level syntax elements.

15. The method of claim 12 wherein the multiple available VLC tables include a low rate table, a medium rate table, and a high rate table.

16. The method of claim 12 further comprising outputting the video frame.

17. A storage medium storing computer-executable instructions for causing a computing device that implements a video decoder programmed thereby to perform a method comprising:

with the computing device that implements the video decoder:

receiving encoded data in a bit stream, wherein the encoded data includes a first single variable length code (VLC) signaled at macroblock level, wherein the first single VLC jointly represents a transform type signal level, a transform type and a subblock pattern, and wherein the encoded data further includes one or more other single VLCs signaled at block level; and reconstructing a video frame, the video frame including a macroblock with plural blocks, the plural blocks including a first block that is coded, and the first block including plural subblocks, wherein the reconstructing includes decoding the first VLC to determine the transform type signal level, the transform type and the subblock pattern, wherein:

the transform type indicates a transform size that applies for the plural subblocks of the first block, the transform type further indicating how the first block is split into the plural subblocks; and the subblock pattern indicates which of the plural subblocks of the first block have at least one non-zero coefficient; and wherein the reconstructing further includes decoding each of the one or more other VLCs.

18. The storage medium of claim 17 wherein the transform type signal level is macroblock level, the transform type applies for each of the plural blocks of the macroblock, and the subblock pattern is for the first block of the macroblock.

19. The storage medium of claim 17 wherein the transform type signal level is block level, the transform type applies for only the first block, and the subblock pattern is for the first block.

20. The storage medium of claim 17 wherein the one or more other VLCs each represent a subblock pattern for one of the plural blocks of the macroblock other than the first block.

21. The storage medium of claim 17 wherein the one or more other VLCs each jointly represents a transform type and a subblock pattern for one of the plural blocks of the macroblock other than the first block.

22. The storage medium of claim 17 wherein the method further comprises:

selecting a first VLC table from among multiple first VLC tables, wherein the decoding the first VLC uses the selected first VLC table; and selecting another VLC table from among multiple other VLC tables, wherein the decoding the one or more other VLCs uses the selected other VLC table.

23. The storage medium of claim 17 wherein the method further comprises outputting the video frame.

24. A method for transforming video information using a computing device that implements a video encoder, the method comprising:

with the computing device that implements the video encoder:

encoding a video frame, the video frame including a macroblock with plural blocks, the plural blocks including a first block that is coded, and the first block including plural subblocks, wherein the encoding the video frame includes encoding a single variable length code (VLC) jointly representing a transform type and subblock pattern, and wherein:

the transform type indicates a transform size that applies for the plural subblocks of the first block, the transform type further indicating how the first block is split into the plural subblocks; and the subblock pattern indicates which of the plural subblocks of the first block have at least one non-zero coefficient; and outputting encoded data including the VLC in a bit stream.

25. The method of claim 24 wherein the transform type applies for only the first block and the subblock pattern is for the first block.

26. The method of claim 24 wherein the VLC further jointly represents a transform type signal level.

27. The method of claim 26 wherein the transform type signal level is macroblock level, the transform type applies for each of the plural blocks of the macroblock, and the subblock pattern is for the first block of the macroblock.

28. The method of claim 26 wherein the transform type signal level is block level, the transform type applies for only the first block, and the subblock pattern is for the first block.

29. The method of claim 24 further comprising selecting a VLC table from among multiple VLC tables, wherein the encoding the VLC uses the selected VLC table.

30. The method of claim 24 wherein the transform type and the subblock pattern are for a motion compensation residual.

* * * * *

UNITED STATES PATENT AND TRADEMARK OFFICE
CERTIFICATE OF CORRECTION

PATENT NO. : 7,830,963 B2  
APPLICATION NO. : 10/893702  
DATED : November 9, 2010  
INVENTOR(S) : Holcomb Page 1 of 1

It is certified that error appears in the above-identified patent and that said Letters Patent is hereby corrected as shown below:

In Title page, in Item (57), under "Abstract" column 2, line 1, after "jointly" insert -- coded --.

In Title page, in Item (57), under "Abstract" column 2, line 2, after "length" insert -- code --.

Signed and Sealed this
Third Day of May, 2011

David J. Kappos
*Director of the United States Patent and Trademark Office*